Aug. 11, 1942.   W. H. BAGLEY, JR., ET AL   2,292,813
VIBRATION DAMPING IN MOTOR VEHICLES
Filed Aug. 13, 1938
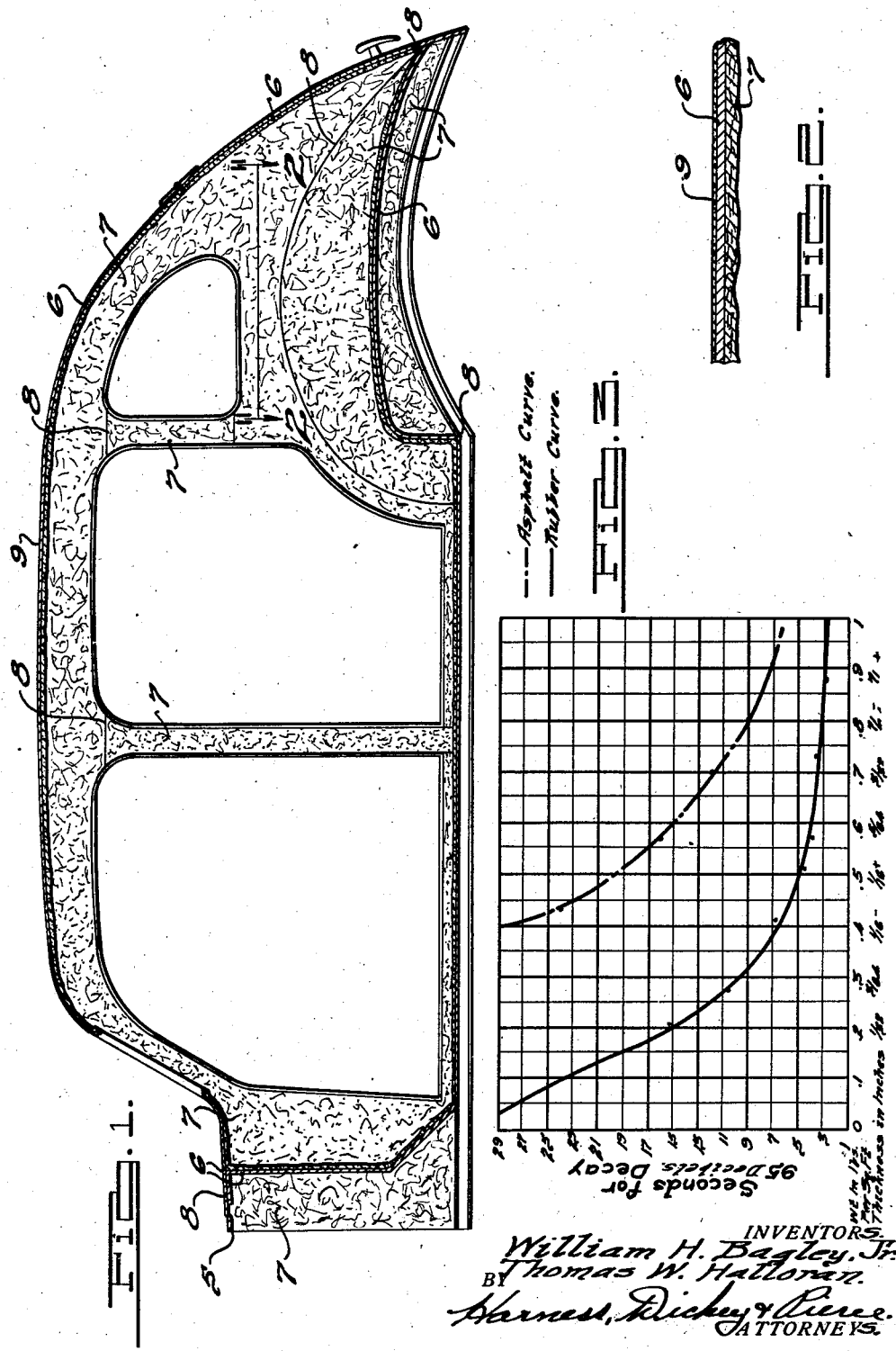
INVENTORS
William H. Bagley, Jr.
Thomas W. Halloran
BY Harness, Dickey & Pierce
ATTORNEYS Patented Aug. 11, 1942

2,292,813

UNITED STATES PATENT OFFICE 2,292,813

VIBRATION DAMPING IN MOTOR VEHICLES

William H. Bagley, Jr., and Thomas W. Halloran, Detroit, Mich., assignors to Composite Materials Corporation, Detroit, Mich., a corporation of Michigan Application August 13, 1938, Serial No. 224,678

16 Claims. (Cl. 260—4)

This invention relates to damping or deadening of vibration in vehicle bodies.

The principal object of the invention is to improve the art of vehicle body construction.

A further object is to provide effective and economical means for damping vibration to prevent breakage due to crystallization of metals or loosening at seams or similar connection.

Another object is to reduce rapidly the intensity of vibrations of metal parts in order to minimize the occurrence and transmission of sound.

A further object is to provide a vibration deadening or damping material which may be applied to metal parts by a spraying process.

Another object is to provide a vulcanizable material, reduced by a solvent for purposes of application, which can be applied to the metal body and cured simply by air drying or by more rapidly drying and vulcanizing the material under the influence of heat involved in the baking process generally employed for curing the paint, lacquer, or enamel finishes on such bodies.

A further object is to provide a vibration damping material which may be applied cold.

Another object is to provide a vibration damping material which is clean and non-corrosive to handle, which adheres tenaciously to metal over a wide range of temperatures and which will not affect paint, lacquer, or enamel finishes.

A further object is to provide a damping material which dissipates vibration more rapidly, has greater rigidity, strength, and wear resistance, than compositions heretofore used for similar purposes.

Another object is to provide a novel method of effecting damping or deadening of vibration in a vehicle body construction.

Other objects, features, and advantages, will become apparent from the following description and appended claims.

For the purpose of illustrating the genus of the invention, a concrete embodiment in the form of an automotive vehicle body is shown in the accompanying drawing treated according to the principle of this invention.

In the drawing:

Figure 1 is a central longitudinal section through an automobile body;

Fig. 2 is an enlarged horizontal view taken substantially on the line 2—2 of Fig. 1; and Fig. 3 is a graph showing comparative characteristics of different types of sound deadening material.

Referring to the drawing, Figures 1 and 2 depict one specific embodiment of the present invention in the form of an automobile body 5, the sheet metal panels 6 of which are coated on the interior surface thereof with a vibration damping material 7. This material is adapted to be applied to the interior surface of the metal panel 6 by spraying or similar process of application and largely eliminates noise and breakage by preventing drumming or rumbling of panels and rapidly damps vibration of such panels to prevent crystallization of metal and consequent breakage at or adjacent seams or similar welded or soldered connections, such as indicated at 8.

The sound proofing and vibration damping material, according to the present invention, consists broadly of a rubber compound including mineral and organic fillers, which is reduced in viscosity by being cut back by a suitable rubber solvent, such as benzole or rubber naphtha so that it may be employed by spraying, and includes vulcanizing and vulcanization accelerating agents, so that it can be cured by the usual heat treatment for the finishing material 9, such as paint, lacquer, synthetic enamel, and primers, or simply cured in air when properly compounded with the correct vulcanizing and accelerating agents. The coating material consists primarily of rubber, an organic filler such as a coumarone type resin, a rubber solvent, such as benzole or rubber naphthas, which are also solvents for the resin, ordinary clay, or similar colloidal material, a moderately fine sand, and a small quantity of a vulcanizing agent such as sulphur, and small quantities of one or more vulcanization accelerating agents. These materials are preferably employed in the following approximate proportions by weight:

| | Per cent |
|---|---|
| Rubber | 4.35 |
| Coumarone resin | 17 |
| Solvent | 11.2 |
| Clay | 23.8 |
| Sand | 43 |
| Stearic acid | 0.167 |
| Zinc oxide | 0.21 |
| Sulphur | 0.21 |
| Accelerators | 0.07 |

The proportions of the essential ingredients may be varied within about the following limits:

| | |
|---|---|
| Rubber | 3 to 6 |
| Resin | 15 to 20 |
| Solvent | 9 to 14 |
| Clay | 20 to 26 |
| Sand | 40 to 46 |
| Vulcanizing and accelerating agents | 0.25 to 0.92 |

The rubber in the above compositions may be any of the commercial grades of plantation rubber or plantation para in any of its commercial forms or may be in the form of reclaimed rubber. The resin is of the coumarone type, preferably a mixture of polymerized para-coumarone and para-indene, and may include meta-styrene, etc., depending upon its source. A previously indicated, the solvent may be any desired rubber solvent. Practically any ordinary types of clay and sand may be employed. In conjunction with the accelerators employed, a small quantity of stearic acid may be used to react with such accelerators when the latter are slightly alkaline in nature. Certain accelerators, however, contain a proportion of stearic acid, or similar organic acid, in order to neutralize the alkaline constituents thereof. Accordingly, in certain instances, the stearic acid may be omitted. A small quantity of zinc oxide is also preferably employed, although this may be replaced by a slightly increased quantity of the sand. Zinc oxide adds to the rigidity of the product. Preferably a number of accelerators are employed to take care of different temperature conditions involved in curing lacquer, primers, and baked enamels, so that the coating material will be adaptable for varying conditions of commercial practice. Lacquers are normally baked at temperatures of from 175° to 200° F., primers at about 200° to 225° F., and baked enamels at from about 275° to 325° F. One accelerator which may be employed consists of approximately 25% by weight, meta-toluylene diamine, 50% phenyl-alpha-naphthylamine, and 25% stearic acid. This accelerator is known under the trade name "Neozone." Another vulcanization accelerator which may be employed is known by the trade name "Zenite," and is a zinc salt of 2-mercapto benzothiazole. A third accelerator preferably employed, especially where the coating material is to be vulcanized during the baking period employed for curing baked enamel, is a tetramethyl thiuiam monosulphide. When baking temperatures ranging from 275° to 325° F. are not to be encountered, this vulcanization accelerator, known by the trade name "Thionex" may be omitted. In the first example embodiment above mentioned, the first described accelerating agent alone may be employed if desired.

Another commercial embodiment of the coating material may take approximately the following proportions by weight:

| | Per cent |
|---|---|
| Rubber | 3.9 |
| Resin | 16.15 |
| Solvent | 9.5 |
| Clay | 24.2 |
| Sand | 46 |
| Stearic acid | 0.057 |
| Zinc oxide | 0.090 |
| Sulphur | 0.090 |
| Zenite | 0.0011 |
| Neozone | 0.028 |
| Thionex | 0.00011 |

A third embodiment of the present coating material may consist approximately of the following proportions by weight:

| | Per cent |
|---|---|
| Rubber | 4.75 |
| Resin | 17.6 |
| Solvent | 12.4 |
| Clay | 23.6 |
| Sand | 40.7 |
| Stearic acid | 0.21 |
| Zinc oxide | 0.28 |
| Sulphur | 0.28 |
| Zenite | 0.086 |
| Neozone | 0.086 |
| Thionex | 0.0086 |

The mineral fillers, clay and sand, especially the colloidal material, clay, aids in maintaining distribution of the resin and prevents segregation of the same. The sand acts as a weighting agent as well as enhancing the strength, wear resistance qualities, and rigidity of the product. The organic fillers, such as the synthetic resin and stearic acid, when the latter is employed, lend cohesiveness to the coating material and combine physically with the mineral fillers employed to give body and rigidity to the coating material.

Heretofore, coating materials employed for a similar purpose generally have an asphalt base and include such fillers as asbestos, resin, drying oils, wood or cork flour, and a dryer. The main disadvantages of such a type of sound deadening and vibration damping material reside in the use of the asphalt base which makes the composition dirty or smutty, has a tendency to damage paint and prevent the paint or similar finishing material from adhering properly to the metal panels, and is somewhat corrosive to the skin, which makes the material disagreeable to work with. The present type of coating material is harder than the asphalt base type since the latter has an initial durometer hardness at room temperature of from about 50 to 60, while the present material has a hardness on the same scale of from about 75 to 90. This increased hardness is desirable since it increases the rapidity with which the material will dampen or deaden vibration and enables the material to effectively seal joints and function as an antisqueak material at certain joints. The present material retains its form and adhesiveness to metal from temperatures well below −30° F. to about 200° F. temperatures.

The intensity of sound depends upon the energy of the wave motion producing such sound. The decibel is the usual unit for measuring the loudness of sound. In telephone practice, it is equivalent to the loss in power in one mile of standard cable at 860 cycles. A difference of one decibel is approximately the smallest change in volume of sound which a normal ear can detect. If a wave motion of a certain arbitrarily chosen intensity is set up in a unit area panel covered by a sound deadening coating, and the coating allowed to dampen the wave motion, the time in seconds required to effect a certain decay in wave intensity measured in decibels will afford a scale for comparison of the dampening effect of such sound deadening material. Fig. 3 is a plot showing curves for asphalt base materials of the prior art and rubber base materials of the present invention and shows times in seconds required to effect a 95 decibel decay in the intensity of the wave motion, as above indicated, to afford a comparison of the dampening effect of the above indicated materials for different thickness of coatings. In this plot, both the weight in pounds per square foot of coating applied to a plate and the thickness of such coating in inches are plotted along the abscissa as an axis and the decay time, measured in seconds when a wave motion of a certain arbitrarily chosen intensity is set up in a unit area panel and diminished by the specified amount, such time being plotted with reference to the ordinate axis.

In automotive vehicle body practice, the time for such reduction in intensity of the intensity of the wave motion should be below about 12 to 15 seconds. It will be noted in connection with the rubber base material that coatings as thin as 3/64ths of an inch will produce the desired damping effect. It will be noted that the asphalt base material requires a coating of more than twice that thickness in order to effect the same results. It will also be noted that the asphalt curve turns up quite abruptly when coatings less than 3/32nd of an inch are employed showing little or no damping. Thus, the sound deadening or vibration deadening effect of an asphalt base material is apparently due practically solely to its weight. On the other hand, the rubber base material for thicknesses between 1/16th and 7/64ths of an inch, having a weight in pounds per square foot of from .4 to .9 of a pound, gives quite uniform results, so that sound dampening must depend upon other factors such as hardness, rigidity, and strength of the rubber base material and not primarily upon its weight. The present material attains its hardness, rigidity, strength, and elasticity during the vulcanization process and may attain the same during a simple air drying if proper vulcanizing and vulcanization accelerating agents are employed in the correct proportions.

Although several embodiments of the invention have been above indicated, it is to be understood that various changes in the proportions of the ingredients and in the ingredients themselves, as well as in the methods of applying the composition, may be made without departing from the spirit and scope of the invention, as defined in the appended claims.

What is claimed is:

1. A vulcanizable viscous homogeneous mass comprising approximately from 3–6% rubber, from 15–20% of a coumarone resin, from 9–14% rubber solvent, and from 60–72% inorganic filler.

2. A vulcanizable viscous homogeneous mass comprising approximately from 3–6% rubber, from 15–20% of a coumarone resin, from 9–14% rubber solvent, from 40–46% sand, from 20–26% clay, and from 25/100 of 1% to 92/100 of 1% vulcanizing and vulcanization accelerating agents.

3. The method of damping vibrations in a relatively thin panel subject to vibration which comprises applying to a surface of said panel a coating of a viscous homogeneous vibration damping mass comprising approximately from 3–6% rubber, from 15–20% of a coumarone resin, and from 9–14% rubber solvent, from 60–72% inorganic filler.

4. The method of damping vibrations in a relatively thin panel subject to vibration which comprises applying to a surface of said panel a coating of a viscous homogeneous vibration damping mass comprising approximately from 3–6% rubber, from 15–20% of a coumarone resin, from 9–14% rubber solvent, from 40–46% sand, from 20–26% clay, and from 25/100 of 1% to 92/100 of 1% vulcanizing and vulcanization accelerating agents.

5. A vibration damping cohesive, viscous and hardenable mass comprising approximately from 15 to 20% of a coumarone resin; from approximately 9 to 14% rubber solvent; from approximately 60 to 72% inorganic filler and the balance including rubber in an amount not greater than 6%.

6. A vibration damping cohesive, viscous and hardenable mass comprising approximately from 15 to 20% of a coumarone resin; from 9 to 14% rubber solvent; a major proportion of inorganic filler and in no event less than 60% and the balance including rubber in an amount not greater than 6%.

7. A vibration damping cohesive, viscous and hardenable mass comprising a major proportion by weight of inorganic filler, of not less than approximately 60% by weight of the composition; a binder for the filler in such an amount as to provide a cohesive hardenable composition having vibration damping properties, the said binder comprising a coumarone resin and rubber not exceeding approximately 26% by weight of the total composition, and a rubber solvent present in an amount sufficient to render the composition viscous and applicable to a surface.

8. The composition as defined in claim 7 in which rubber is present in an amount not greater than approximately 6% by weight of the composition.

9. The composition as defined in claim 7 in which the inorganic filler comprises a substantial quantity of sand.

10. The composition as defined in claim 7 in which the inorganic filler includes a predominant proportion of sand.

11. The composition as defined in claim 7 in which the inorganic filler includes sand in an amount at least 40% of the total composition.

12. The composition as defined in claim 7 in which the inorganic filler comprises a predominant percentage of sand and a minor portion of clay.

13. The composition as defined in claim 7 in which the binder includes coumarone resin in a proportion greatly exceeding that of the rubber.

14. The composition as defined in claim 7 in which the binder includes a predominant proportion of a coumarone resin.

15. The composition of claim 7 but which composition is vulcanizable.

16. The composition of claim 7 having added thereto a vulcanizing and vulcanization accelerating agent.

WILLIAM H. BAGLEY, Jr.
THOMAS W. HALLORAN.